United States Patent
Mueller et al.

(10) Patent No.: US 10,134,051 B1
(45) Date of Patent: Nov. 20, 2018

(54) METHODS AND SYSTEMS FOR AUDIO IDENTIFICATION AND REWARD PROVISION AND MANAGEMENT

(71) Applicants: William R Mueller, La Vergne, TN (US); Ramesh Somasundaram, Irving, TX (US)

(72) Inventors: William R Mueller, La Vergne, TN (US); Ramesh Somasundaram, Irving, TX (US)

(73) Assignee: CT ACQUISITION HOLDCO, LLC, Phoenix, AZ (US)

( * ) Notice: Subject to any disclaimer, the term of this patent is extended or adjusted under 35 U.S.C. 154(b) by 1168 days.

(21) Appl. No.: 13/915,197

(22) Filed: Jun. 11, 2013

Related U.S. Application Data

(60) Provisional application No. 61/658,056, filed on Jun. 11, 2012, provisional application No. 61/664,096, filed on Jun. 25, 2012.

(51) Int. Cl.
*G06Q 30/00* (2012.01)
*G06Q 30/02* (2012.01)
*G06F 17/30* (2006.01)

(52) U.S. Cl.
CPC .............. *G06Q 30/0207* (2013.01)

(58) Field of Classification Search
CPC ......... G06F 17/30038; G06F 17/30053; G06F 17/30743; G06F 17/30758; G06Q 30/02
See application file for complete search history.

(56) References Cited

U.S. PATENT DOCUMENTS

| 7,150,028 | B1* | 12/2006 | Ranta | H04N 7/085 725/23 |
|---|---|---|---|---|
| 8,065,700 | B2* | 11/2011 | Lee | G06K 9/00523 725/17 |
| 8,924,345 | B2* | 12/2014 | Bryan | G06F 17/30743 707/610 |
| 9,786,298 | B1 | 10/2017 | Greene | |
| 2005/0097312 | A1* | 5/2005 | Mihcak | G06F 17/30026 713/150 |
| 2006/0075883 | A1* | 4/2006 | Thorne | G10H 1/0008 84/616 |
| 2007/0179356 | A1* | 8/2007 | Wessel | A61B 5/14532 600/300 |
| 2007/0288952 | A1* | 12/2007 | Weinblatt | H04N 7/173 725/23 |
| 2010/0312630 | A1* | 12/2010 | Krutchik | G06Q 30/02 705/14.35 |
| 2011/0047017 | A1* | 2/2011 | Lieblang | G06Q 30/02 705/14.13 |
| 2011/0173185 | A1* | 7/2011 | Vogel | G06F 17/30038 707/722 |
| 2013/0110513 | A1 | 5/2013 | Jhunja et al. | |

OTHER PUBLICATIONS

Jacobs, B. "How Shazam Works to Identify (Nearly) Every Song You Throw at It", Sep. 24, 2010' https://gizmodo.com/5647458/how-shazam-works-to-identify-nearly-every-song-you-throw-at-it.

* cited by examiner

*Primary Examiner* — Fonya M Long
*Assistant Examiner* — Thuy N Nguyen
(74) *Attorney, Agent, or Firm* — Cooper & Dunham LLP

(57) ABSTRACT

Methodologies and apparatuses are provided for identifying audio by analyzing time chunks of audio in the frequency domain, providing rewards associated with identified inputs and managing and monitoring the provision of rewards are provided.

8 Claims, 13 Drawing Sheets

Figure 3B

METHODS AND SYSTEMS FOR AUDIO IDENTIFICATION AND REWARD PROVISION AND MANAGEMENT

CROSS-REFERENCE TO RELATED APPLICATIONS

This patent application is based on, and claims benefit under 35 U.S.C. § 119(e) to, U.S. Provisional Patent Applications Nos. 61/658,056 filed on Jun. 11, 2012 and 61/664,096 filed on Jun. 25, 2012.

TECHNICAL FIELD

This disclosure relates to an approach for identifying audio, providing rewards associated with identified inputs such as audio, and managing such rewards.

DESCRIPTION OF RELATED ART

The use of applications installed on mobile devices such as smartphones or tablet computers, particularly in the context of retail programs such as coupon distribution, promotions, or more generally, application rewards management, is generally known.

Typically, these applications require a consumer to navigate to a web site maintained by a coupon sponsor (such as a product web site or online merchant web site) where the programs and specific features are presented. Valuable usage statistics related to a consumer's activities on the web site can also be recorded and provided to a retailer or application manager.

The use of "hands free" audio commands to navigate and control these applications are available but are greatly affected by background noise, user dialect, and other factors.

Another approach for distributing coupons relies on recording a small sample of a specific audio event (such as a television or radio commercial) and matching it to an origin from a previously assembled data base of commercials. Once matched, a coupon associated with the commercial can be delivered to the user. In such a system, each audio file may be fingerprinted, a process by which reproducible tokens are extracted from the recorded audio. The fingerprints from the recorded sample are matched against a large set of fingerprints derived from the music database.

In such a system, the recorded audio is converted from a time domain to frequency domain by the use of Fourier transform algorithms (FFTs). Then the fingerprints of the converted recorded audio are compared to a previously compiled database of similar fingerprints obtained from known audio recordings to determine a match for the recorded audio. More specifically, this method compares timing offsets of identical fingerprints from the recorded audio and the known audio. A high number of offset matches predict a high likelihood that the recorded audio is a match to the known audio. Thus by listening to only a few seconds an entire commercial, the commercial may be identified.

This method has particular success in matching when the audio has high entropy or randomness throughout, as is typically the case in a musical performance. This type of audio creates many unique fingerprints and timing offset pairs so false matches of recorded audio to known audio are minimized. However, since many commercials contain predominantly simple spoken words (and as a result low entropy of the fingerprint and offset data), the fingerprint offset matching method tends to create excessive and spurious matches making correct identification nearly impossible.

Thus there is a need for a new method for identifying audio as well as a system which addresses audio identification, application rewards management, and usage statistics monitoring.

BRIEF SUMMARY

In an aspect of the present disclosure, a computer implemented method is provided for correlating input audio data with known audio data. Such method can include converting input audio data into a byte array in a time domain, selecting a chunk of bytes from the byte array corresponding to a time segment of the input data, transforming the chunk of bytes from the time domain to a frequency domain, identifying, for a plurality of frequency ranges, a frequency subrange within each range of frequencies at which the transformed chunk of bytes has a maximum amplitude, recording a plurality of alphanumeric frequency references corresponding to the identified frequency subranges as an alphanumeric chunk hash key characteristic of the chunk of bytes from the input audio data, comparing the chunk hash key to a reference hash key characteristic of other audio data to determine if the input audio data is a likely match to the other audio data; and outputting a result of the comparison.

In another aspect, a client computer system is configured (such as by application or other software) to identify an input upon receipt of an identification command from a user, communicate the input identification to a reward management apparatus, receive from a reward management apparatus a reward associated with the input identification comprising a reward image, an obscured reward redemption image and an unobscured reward redemption image, store the reward, display the reward image together with the obscured reward redemption image, display the reward image together with the unobscured reward image only after receiving a redemption command from a user and delete the reward.

In yet another aspect, a reward management apparatus is configured to select a reward from a plurality of rewards which corresponds to the input identification upon receipt of an identification of an input from a client computer system, communicate a reward image, an obscured reward redemption image and an unobscured reward redemption image comprising the selected reward to the client computer system and increment a reward provision metric associated with the selected reward and receive from a client computer system confirmation that the selected reward has been redeemed and increment a reward redemption metric associated with the selected reward.

In still another aspect, a computer implemented method is provided for presenting advertisement and reward metrics. Such methodology can comprise providing an advertisement to a user, receiving an identification of the advertisement from the user and incrementing an associated advertisement identification metric, providing a reward associated with the advertisement to the user and incrementing an associated reward provision metric based on the identification of the advertisement received from the user, receiving confirmation that a reward has been redeemed and incrementing an associated reward redemption metric, and displaying the advertisement identification metric, reward provision metric and reward redemption metric.

BRIEF DESCRIPTION OF THE DRAWINGS

The aforementioned and other aspects, features and advantages can be more readily understood from the following detailed description with reference to the accompanying drawings wherein:

FIG. 3B is a graph showing the chunk of audio shown in FIG. 3A transformed into the frequency domain according to another exemplary embodiment of the present disclosure;

DETAILED DESCRIPTION

Methodologies and apparatuses for identifying audio, providing rewards associated with identified inputs such as audio and managing the provision of rewards are described herein, with reference to examples and exemplary embodiments. Specific terminology is employed in describing examples and exemplary embodiments. However, the disclosure of this patent specification is not intended to be limited to the specific terminology so selected and it is to be understood that each specific element includes all technical equivalents that operate in a similar manner.

For example, the term "client computer system" as used in this application generally refers to a mobile device (cell phone, smartphone, tablet computer, ebook reader, etc.), computer (laptop, desktop, gaming console, etc.), television display (plasma, LCD, CRT, OLED, etc.) etc. having sufficient input, storage, processing and output capabilities to execute one or more instructions as will be described in detail herein and as will be appreciated to those skilled in the relevant arts.

As another example, the term "server" generally refers to any one or more network connected devices configured to receive and transmit audio or other information to and from a client computer system and having sufficient input, storage, processing and output capabilities to execute one or more instructions as will be described in detail herein and as will be appreciated to those skilled in the relevant arts. For example, a "cloud server" may be provided which may not actually be a single server but is a collection of one or more servers acting together as a shared collection of storage and processing resources. Such collection of servers need not all be situated in the same geographic location and may advantageously be spread out across a large area.

Figure 1:
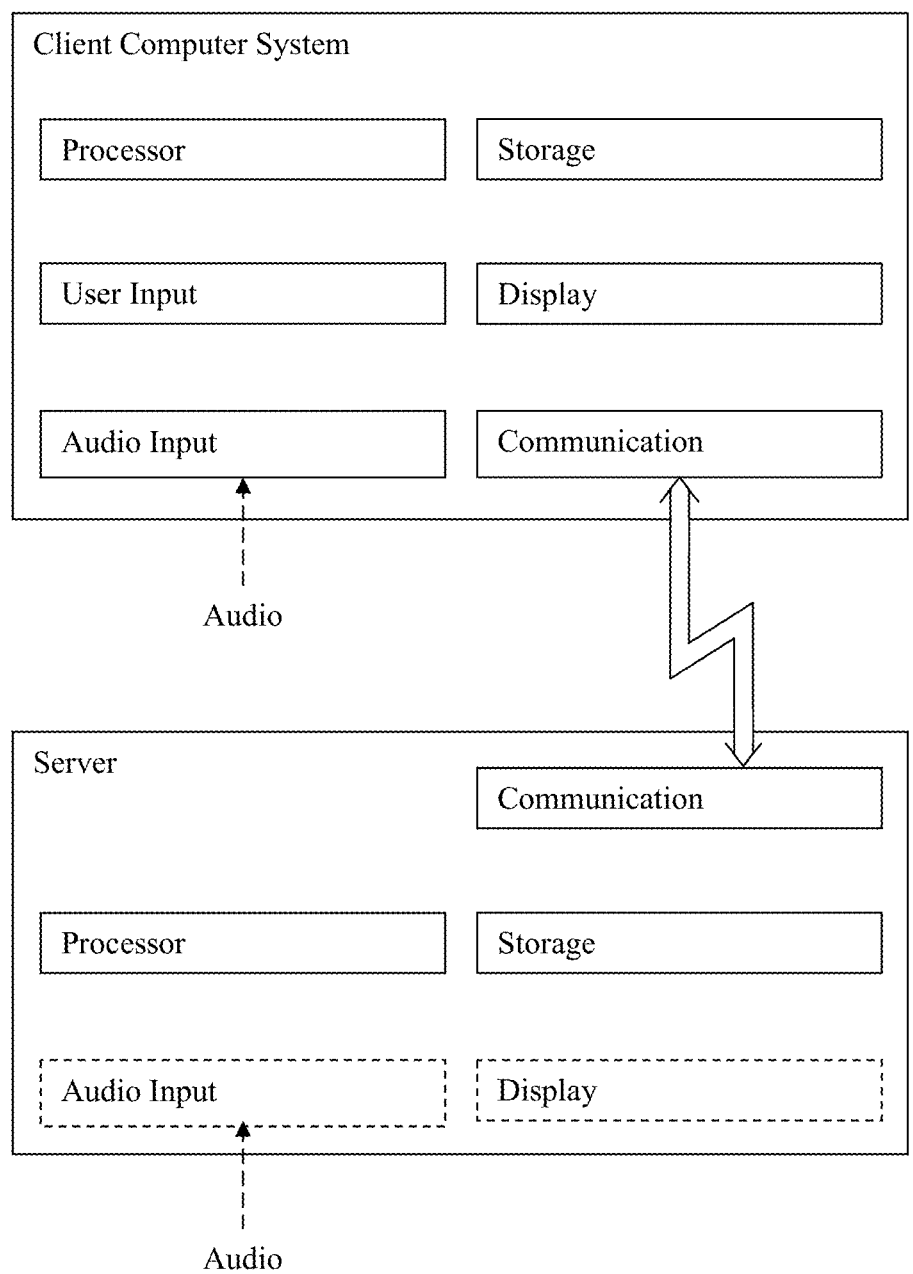
FIG. 1 notionally illustrates a client computer system and server according to an exemplary embodiment of the present disclosure.

Examples of a client computer system and a server are shown in FIG. 1. A client computer system includes a processor, a storage part, a user input part, an audio input part and a communication part. A server includes a storage part, a processor, and a communication part.

The term "storage part" as used in this application generally refers to any (one or more of) apparatus, device, composition, and the like, capable of retaining information and/or program instructions for future use, copying, playback, execution and the like. Some examples of storage parts include solid state storage devices, platter-type hard drives, virtual storage media and optical storage media formats such as CDs, DVDs and BDs, etc.

Examples of possible user input parts include physical buttons which may be displaced by some small amount to register an input, touch-type inputs which register user input without noticeable displacement, for example capacitive or resistive sensors or buttons, a touch screen, etc. A user input part may also include, for example, a microphone and voice translation processor or program to receive voice commands, acceleration sensors to receive movement or gesture commands such as horizontal or vertical waving or tipping motions, etc.

The audio input part may be any device or system of devices configured to receive audio information and make it available to other components of the client computer system. For example, the audio input part may comprise a microphone, an analog to digital converter (A/D converter), an audio input jack for receiving analog or digital audio from a source, a portion of digital storage storing a recorded clip of audio, etc.

The communication part may be a wired or wireless data communication part, configured to transmit and/or receive data (which may include audio or other information) to and/or from a remote server or other electronic device. Such wired or wireless data communication part may the same as or different from any wired or wireless audio output part. As an example, a wireless data communication part may be configured to communicate data according to one or more data communication protocols, such as GSM (Global System for Mobile Communications), GPRS (General Packet Radio Service), CDMA (Code Division Multiple Access), EV-DO (Evolution-Data Optimized), EDGE (Enhanced Data Rates for GSM Evolution), 3GSM, HSPA (High Speed Packet Access), HSPA+, LTE (Long Term Evolution), LGE Advanced, DECT, WiFi™, Bluetooth™, etc. As one example, a wireless data communication part may be configured to communicate data with across a cellular telephone network using an appropriate protocol to and/or from a remote internet server, for example, to download text information and/or audio information to the client computer system.

The client computer system or server may include one or more displays capable of displaying text or graphics. Examples of types of displays possibly comprised in a client computer system include e-ink screens, LCD (Liquid Crystal Display), TFT (Thin Film Transistor), TFD (Thin Film Diode), OLED (Organic Light-Emitting Diode), AMOLED (Active-matrix organic light-emitting diode) displays, etc. Displays may also include additional functionality such as touch sensitivity and may comprise or at least may communicate with the user input part. For example, the display of the client computer system may include capacitive, resistive or some other type of touch screen technology. Generally, such touch screen technology is capable of sensing the position and sometimes even the force with which a user may touch the screen with one or more of their fingers or compatible implements.

In an aspect of the present application, a client computer system or server may execute instructions tangibly embodied in a storage part, using a processor, to recognize, match or identify audio. Such instructions are generally collectively referred to herein as a "program" for convenience and brevity.

Figure 2:
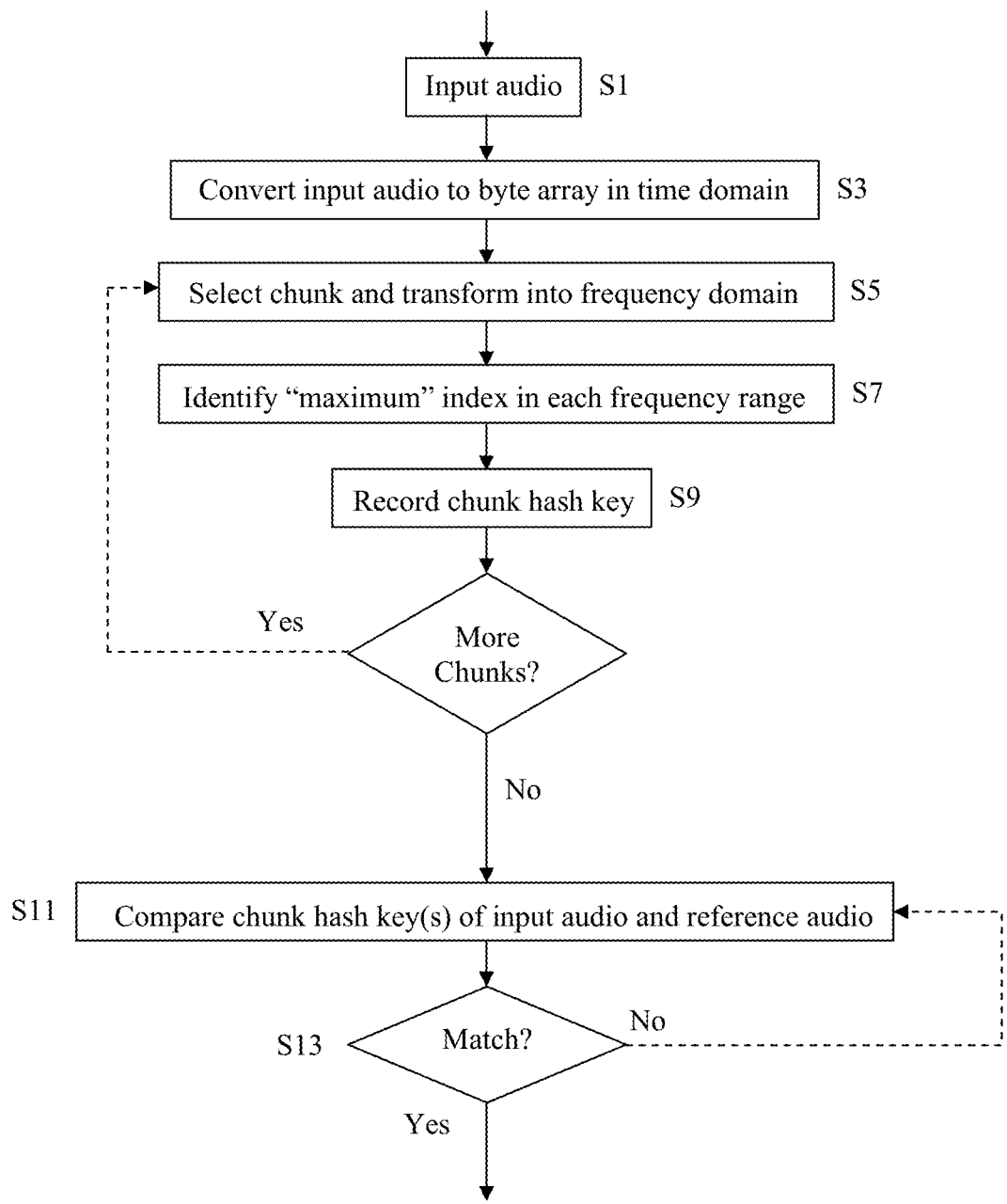
FIG. 2 is a notional flowchart illustrating an audio comparison program according to an exemplary embodiment of the present disclosure.

An example of an audio identification program is described generally by the flowchart shown in FIG. 2.

First, audio is input S1 using the audio input part. As described above, the audio may be recorded by a microphone, recalled from the storage part, etc.

The audio is converted S3 into a byte array in the time domain, if not already so converted. Such conversion may be performed using any method known in the art. For example, analog audio received by a microphone may be converted by a A/D converter into a digital byte array in the time domain.

Figure 3A:
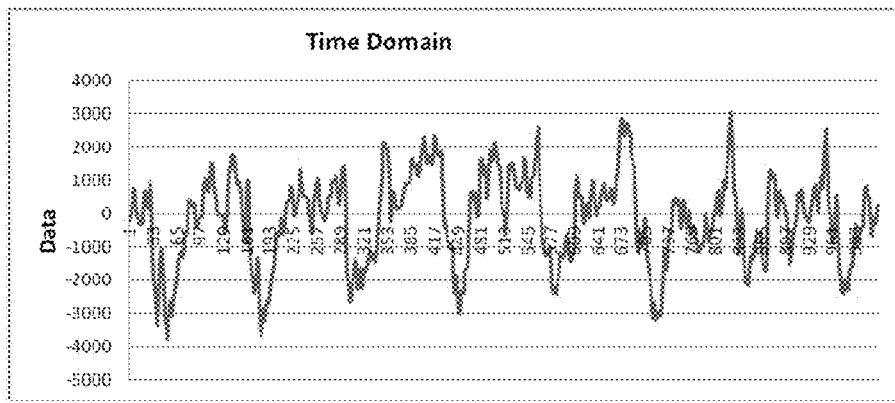
FIG. 3A is a graph showing a chunk of audio in the time domain according to an exemplary embodiment of the present disclosure.
Figure 4:
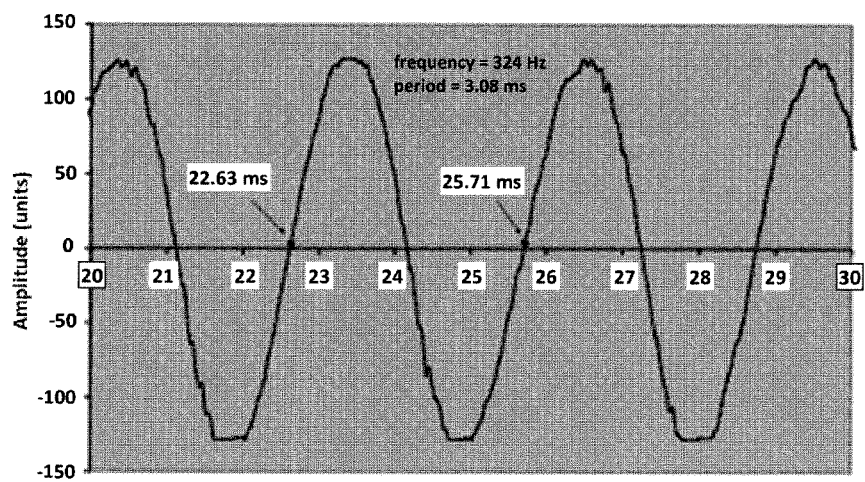
FIG. 4 is a graph showing a chunk of audio in the time domain according to an exemplary embodiment of the present disclosure.
Figure 5:
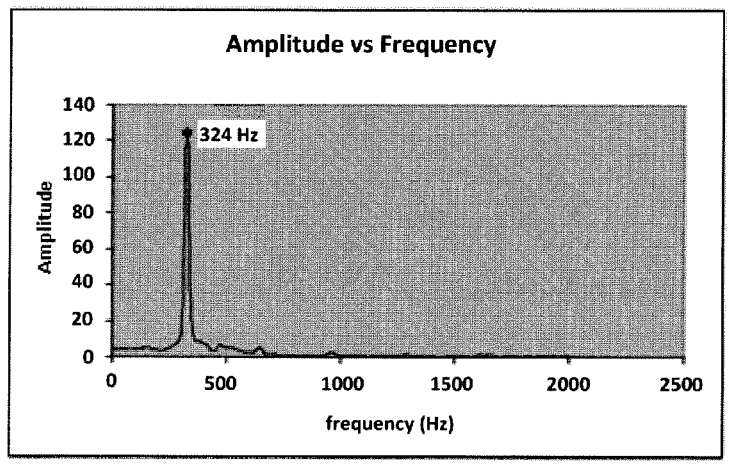
FIG. 5 is a graph showing a chunk of audio transformed in the frequency domain according to an exemplary embodiment of the present disclosure.

A chunk of bytes is selected from the byte array and transformed into the frequency domain S5. The size of the chunk may be selected to be a power of 2—for example 256 (2^8) or 512 (2^9) bytes. The transformation from the time domain to the frequency domain may be performed using a FFT process or some other suitable process. As one example, the time-domain digital audio data shown in FIG. 3A is converted into the frequency-domain data shown in FIG. 3B. In another example, FIG. 4 shows a portion of audio in a time domain and FIG. 5 shows a portion of audio that has been transformed to the frequency domain.

In the frequency domain, the transformed audio data may be delineated by a plurality of frequency indices. An index may correspond to a predetermined range of frequencies. For example, index 1 may comprise frequencies 0 Hz to 5 Hz, index 2 may comprise frequencies 5 Hz to 10 Hz, etc. The size of the frequency range corresponding to an index is not limited, and may be infinitesimally small—i.e. an index may practically represent a single frequency. The size of the frequency ranges corresponding to the various indices of transformed audio data may be consistent for all frequencies or may be different depending on the frequency. For example, index 1 may correspond to 0 Hz to 5 Hz while index 2 may correspond to 5 Hz to 15 Hz. It is important, though, that the nature of the indices used in analyzing input audio and the indices used in analyzing reference audio be consistent with one another. Indices may be labeled with alphanumeric or numeric references.

The transformed chunk is then analyzed to determine the index which has a maximum amplitude within a range of indices for a plurality of index ranges S7.

Figure 3C:
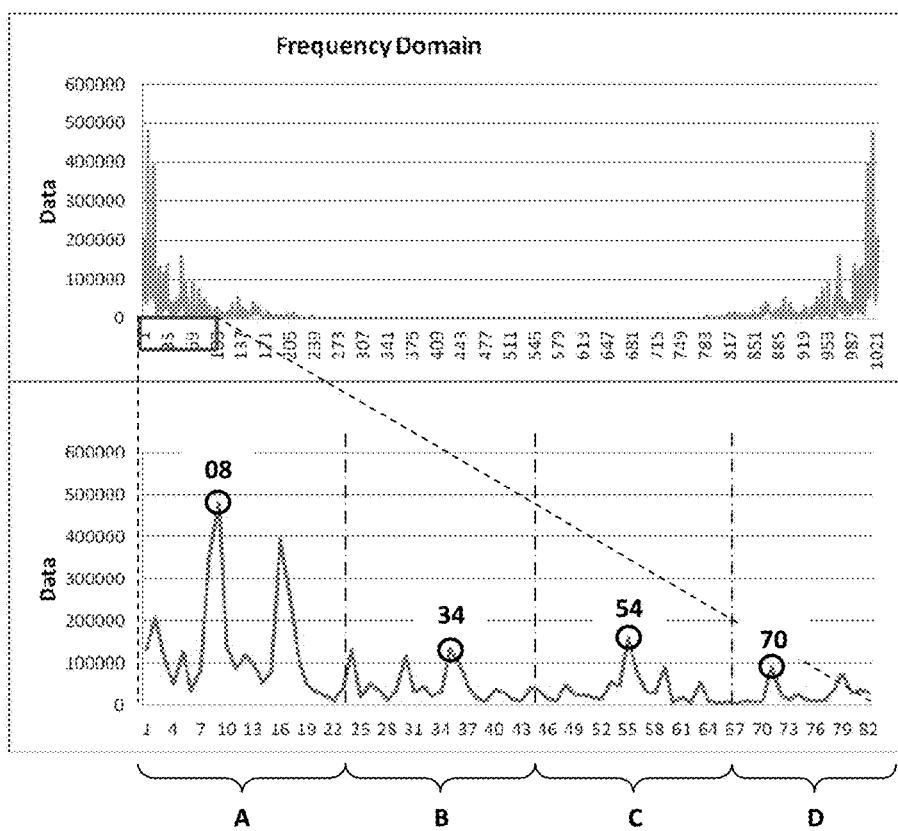
FIG. 3C is a graph showing a subset of the frequency-domain data shown in FIG. 3B according to another exemplary embodiment of the present disclosure.

As one example, FIG. 3C shows a portion of transformed audio in the frequency domain which is a subset of the transformed audio in the frequency domain shown in FIG. 3B. The data is divided into frequency ranges and subranges within those frequency ranges. For example, frequency ranges A-D and frequency subranges 1-82 in FIG. 3C. Frequency ranges need not be adjacent or mutually exclusive (they may have gaps therebetween or overlap) and they may not be consistent in size from one to the next, but the frequency ranges should be consistently applied from chunk analysis to chunk analysis. Frequency subranges are identified which have a maximum value within a frequency range and those values are concatenated into a hash key characteristic of the chunk of audio data. For example, in FIG. 3C, the identification of frequency subranges 08, 34, 54 and 70 are concatenated into a hash key "70 54 34 08."

Figure 6:
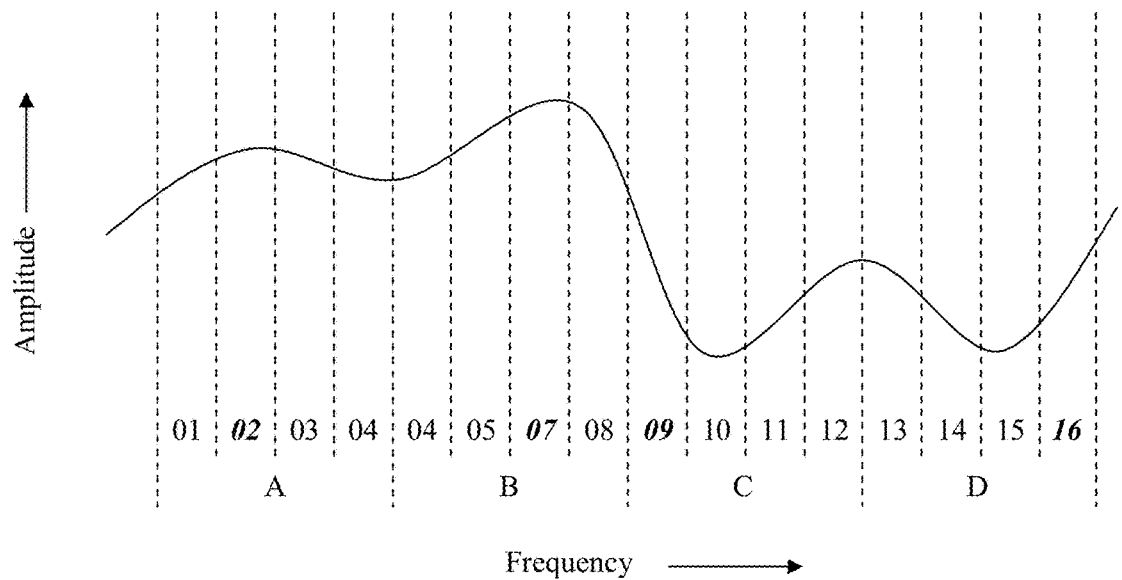
FIG. 6 is a graph showing a portion of audio transformed in the frequency domain according to another exemplary embodiment of the present disclosure.

As another example, FIG. 6 shows a portion of transformed audio in the frequency domain. In frequency range A, index 02 has the highest amplitude. In frequency range B, index 07 has the highest amplitude. In frequency range C, index 09 has the highest amplitude. And finally, in frequency range D, index 16 has the highest amplitude. Such analysis may be performed for some or all of the frequency ranges of the transformed audio chunk.

References corresponding to the identified "maximum" indices are recorded together as a chunk hash key S9. In one example, the alphanumeric references may be concatenated to form an alphanumeric chunk hash key. For example, the references corresponding to the maximum indices of the chunk shown in FIG. 6 may be concatenated to form a chunk hash key of "02070916." Chunk hash keys may be obtained in a similar way for a plurality of chunks of input audio data. In one example, approximately 20,000 chunks may be analyzed corresponding to approximately 30 seconds of input audio. Chunk hash keys may be recorded by themselves or together with an identification of the chunk from which they were obtained.

The chunk hash key(s) obtained from a chunk of input audio data is compared to previously obtained chunk hash key(s) obtained from reference audio chunks S11. In one example, fewer chunk keys may be obtained from reference audio than from input audio. For example, approximately 2000 chunk hash keys may be obtained from each reference audio sample while 20,000 chunk hash keys may be obtained from input audio. Alternatively, fewer input audio chunk hash keys may be obtained than reference audio chunk hash keys.

In describing the steps shown in FIG. 2, the steps are described separately. However, the steps may be combined or may be augmented with other steps not described herein. In addition, the steps of the methods described herein need not be completed by the same or even connected computing devices. For example, some steps may be performed by a first device, other steps by a second device and still others by a third device.

In one example, chunk hash keys from input audio and reference audio may be statistically compared by calculating a correlation coefficient r. For example, the expression:

$$r = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

Expression 1 may be used to calculate the correlation coefficient for each hash key comparison where X is the sample increment and Y is the reference corresponding the index with the highest amplitude in each frequency range and n is each frequency range. Using Expression 1, a correlation coefficient approaching 1 indicates a good match. Hash keys may be parsed to separate the "maximum" index keys before Expression 1 is calculated.

Figure 7:
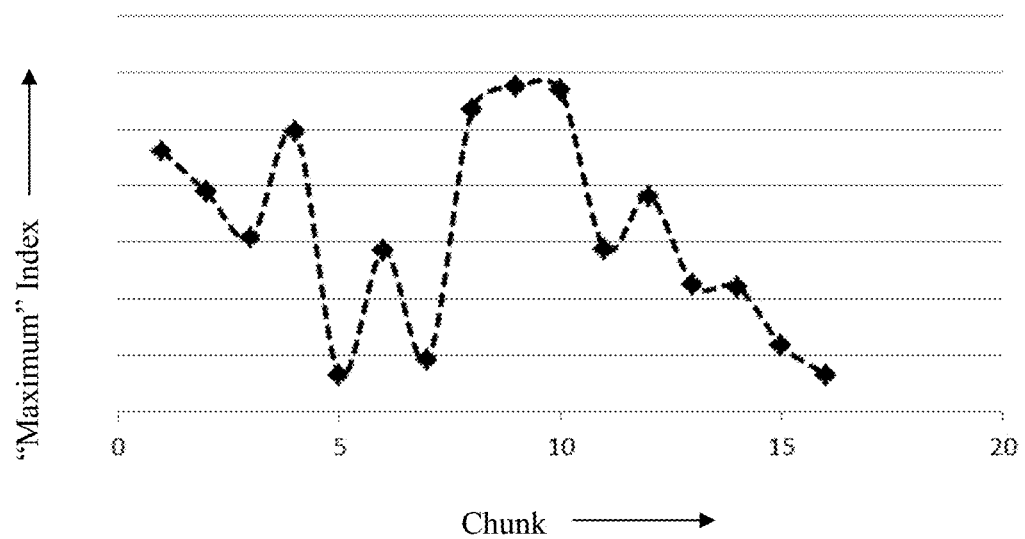
FIGS. 7-9 are graphs illustrating "maximum" indices for a particular frequency range of chunks of audio according to an exemplary embodiment of the present disclosure.
Figure 8:
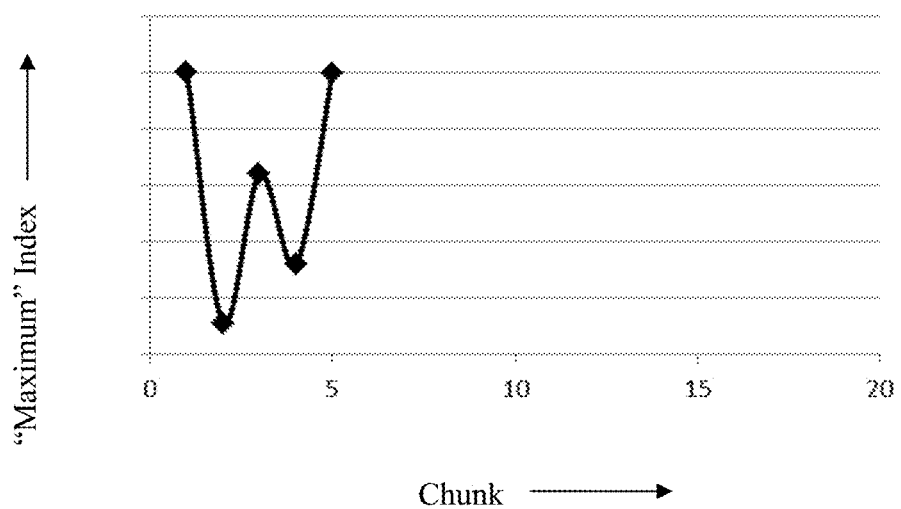
Figure 9:
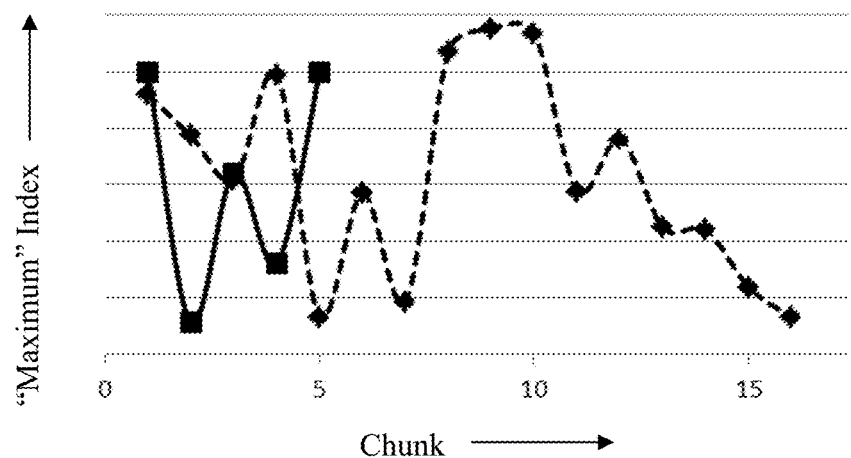

Correlation coefficients may be calculated by use of Expression 1 for a plurality of chunks of input audio and reference audio. For example, FIG. 7 represents "maximum" index references for a particular frequency range of chunks of reference audio and FIG. 8 represents "maximum" index references for the particular frequency range of chunks of input audio. FIGS. 7 and 8 are overlaid for comparison in FIG. 9. In the example shown in FIGS. 7-9, the correlation coefficient calculated between the reference audio chunks and the input audio chunks using Expression 1 would be relatively low, indicating a poor match.

In another example, Expression 1 may be used to calculate correlation coefficients between a plurality of input audio chunks and reference audio chunks at successive time offsets. For example, input audio chunks 1-500 may first be compared to reference audio chunks 1-500 using Expression 1. Then, a time offset of 1 may be introduced and input audio chunks 2-501 may be compared to reference audio chunks 1-500. Many time offsets may be introduced in this manner to obtain time shifted correlation coefficients using Expression 1. Correlation coefficients may be averaged for each plurality of chunk hash keys compared. Correlation coefficient averages from each time offset may be compared. Accordingly, input audio may be compared to and matched with reference audio by setting a "match" as any comparison having a correlation coefficient over a predefined threshold S13.

Figure 10:
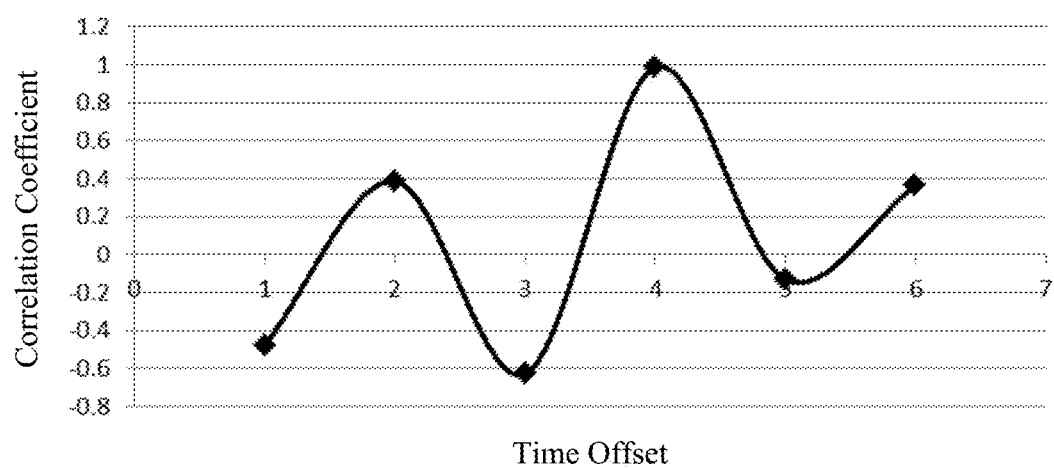
FIG. 10 is a graph illustrating correlation coefficient as a function of time offset according to an exemplary embodiment of the present disclosure.
Figure 11:
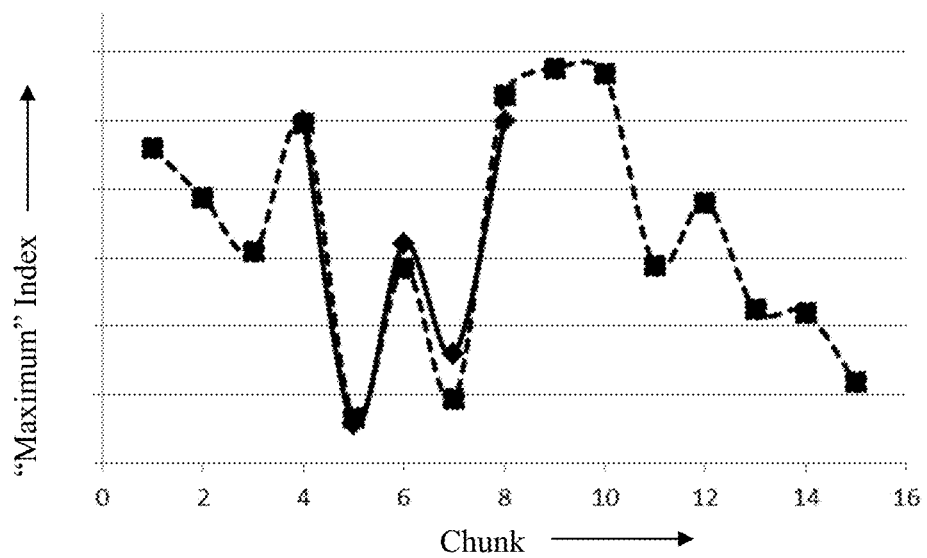
FIG. 11 is a graph illustrating "maximum" indices for a particular frequency range of chunks of audio according to another exemplary embodiment of the present disclosure.

For example, in FIG. 10, averaged correlation coefficients are plotted as a function of time offset applied. A time offset of 4 for the comparison between this particular set of input and reference audio results in a correlation coefficient of almost 1, as calculated using Expression 1, which indicates a good match. FIG. 11 shows the overlaid "maximum" index values for the reference and input audio data shown in FIGS. 7-9, but with a time shift of 4 introduced.

Of course, input audio data may not be a good match with particular reference audio at any time offset. Input audio may be compared with a plurality of reference audio in the manner described above in order to find a match or the best match.

Figure 12:
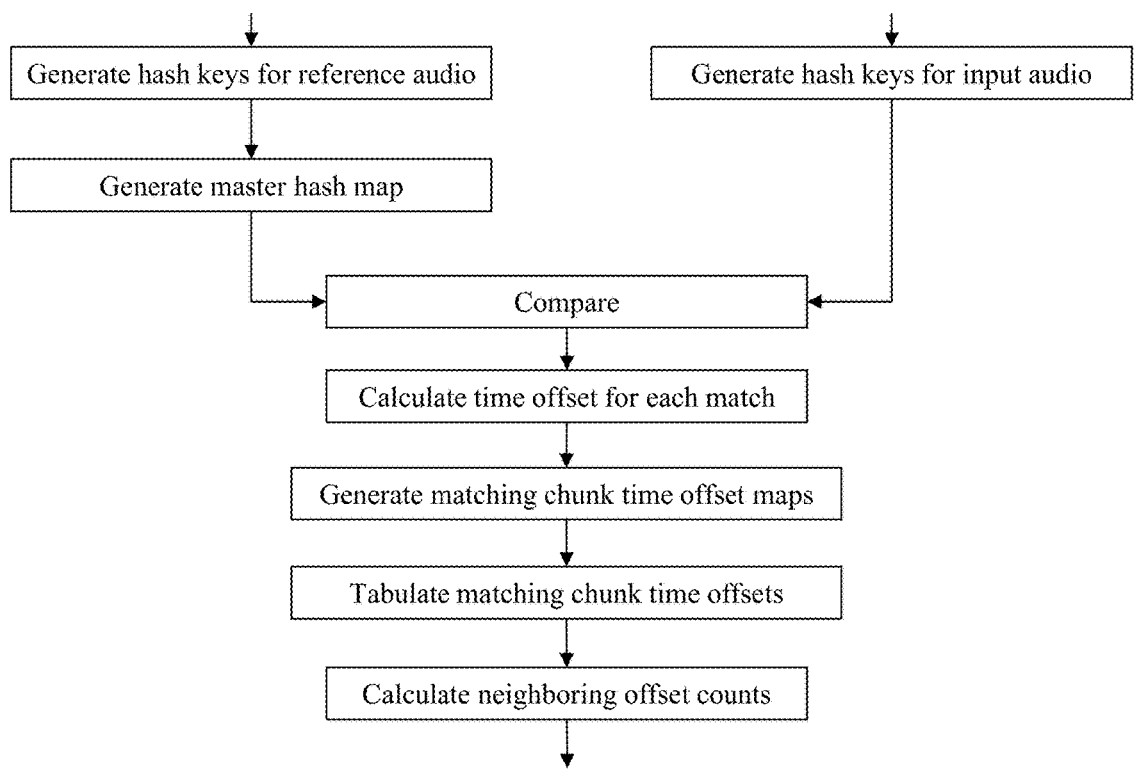
FIG. 12 is a notional flowchart illustrating an audio comparison program according to another exemplary embodiment of the present disclosure.

In another aspect of the present application, depicted generally in FIG. 12, input audio data may be matched with reference audio by comparing chunk hash keys derived from input audio data to a master hash key derived from one or more portions of reference audio.

In an example, hash keys are generated as described above with reference to steps S1-S9 of FIG. 2 for a plurality of chunks of a portion of reference audio. Hash keys may be generated for a plurality of chunks of other portions of reference audio as well. For example, hash keys may be generated for all or a portion of a plurality of different advertisements, songs, videos, movies, television show episodes, etc. airing on television or radio. The various chunk hash keys may be identified by an indication of which chunk and which portion of reference audio they were generated from.

Next, a master hash map may be generated from a plurality of chunk hash keys generated from a portion of reference audio. For example, a master hash map, an example of which is shown below in Table 1, may be an array listing each hash key and an identification of which chunk that hash key pertains to. Of course, a hash key may be the same for a plurality of different chunks.

TABLE 1

| Hash Key | Chunk ID |
|---|---|
| 76483414 | Chunk 1 |
| 64562804 | Chunk 2, Chunk 81 |
| 80624220 | Chunk 3, Chunk 57, Chunk 443 . . . |
| . . . | . . . |

In another example, a master hash map may be generated from a plurality of chunk hash keys generated from a plurality of reference audio portions. Such a master hash map may be generated directly from the hash keys generated from the chunks of the portions of reference audio or may be generated from individual master hash maps for each of the portions of reference audio. A master hash map relating to a plurality of reference audio portions, an example of which is shown below in Table 2, may include an array listing each hash key and an identification of which chunk of which portion of reference audio that hash key pertains to.

TABLE 2

| Hash Key | Chunk & Reference ID |
|---|---|
| 76483414 | Chunk 1 in Ad 1, Chunk 33 in Ad 4, Chunk 104 in Episode 8 |
| 64562804 | Chunk 2 in Ad 1, Chunk 81 in Ad 1, Chunk 94 in Song 5 |
| 80624220 | Chunk 3 in Ad 1, Chunk 57 in Ad 1, Chunk 443 in Ad 1, Chunk 28 in Movie 9 . . . |
| . . . | . . . |

Similarly, hash keys may be generated for chunks of input audio and an input audio hash map, similar to the master hash map example shown above in Table 1, may be generated from the input audio chunk hash keys.

Input audio chunk hash keys may be compared to the master hash map. For example, the master hash map may be searched for a particular hash key. If that hash key is found in the master hash map, the corresponding chunk and reference identification information may be returned and recorded. Hash keys for each chunk of input audio may compared to the master hash map in a similar manner.

A time offset may be calculated for each match. For example, a time offset may be calculated by subtracting the reference chunk number from a matching input audio chunk number. As an example, if a hash key generated from chunk 20 of input audio matches a hash key generated from chunk 34 of a portion of reference audio, a time offset of −14 may be calculated by subtracting 34 from 20.

A matching chunk time offset map, an example of which is shown below in Table 3, may be generated from time offsets calculated for each match between input audio chunk hash keys and reference chunk hash keys. A result time offset map may include an identification of a portion of reference audio and time offsets for each match between the input chunk hash keys and reference hash keys for chunks within that portion of reference audio.

TABLE 3

| Reference Portion | Chunk Match Time Offsets |
| --- | --- |
| Ad 1 | −14, 74, 23, 74, −27, 34, −19, 75, 74 |
| Ad 4 | 18, 19, −4, 18, 19, 44, 19, 19, 12, 19 |
| Episode 9 | −213, 92, 43, 56, −12, 11, 85 . . . |
| . . . | . . . |

Analysis of the matching chunk time offset map may include tabulating the occurrence of each time offset value for each portion of reference audio and sorting time offsets by decreasing number of occurrences. As an example, the matching chunk time offset map of Table 3 may be analyzed to produce the example shown below in Table 4.

TABLE 4

| Reference Portion | Chunk Match Time Offsets |
| --- | --- |
| Ad 1 | 74(3), −14(1), 23(1), −27(1), 34(1), −19(1), 75(1) |
| Ad 4 | 19(4), 18(2), −4(1), 44(1), 12(1) |
| Episode 9 | −213(1), 92(1), 43(1), 56(1), −12(1), 11(1), 85(1) . . . |
| . . . | . . . |

The most likely match is the reference portion having the time offset with the highest number of occurrences, referred to herein as the highest offset count. In the example shown in Tables 3 and 4, the most likely match for the input audio is "Ad4."

Figure 13A:
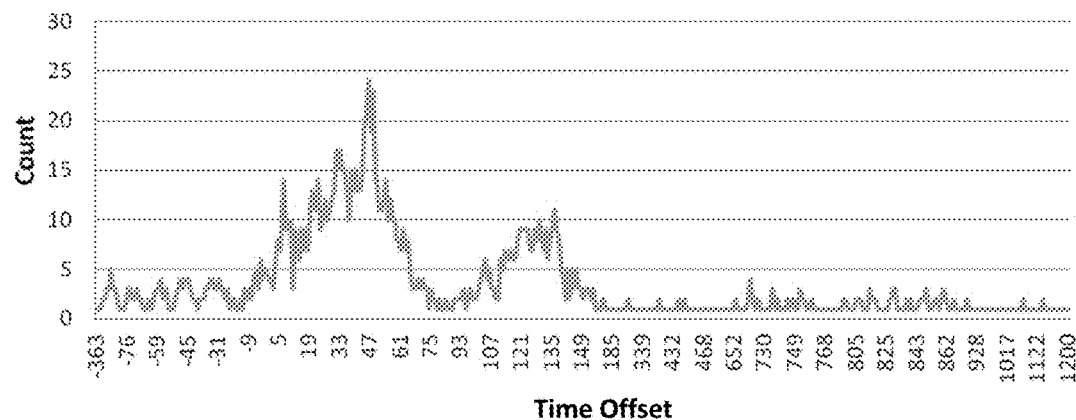
FIG. 13A is an exemplary graph of offset count data resulting from a comparison of matching chunks of audio according to another exemplary embodiment of the present disclosure.
Figure 13B:
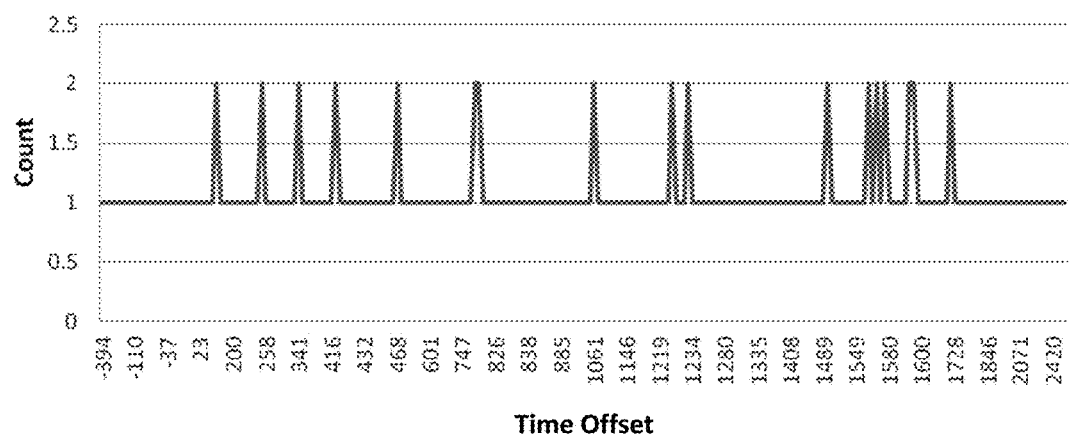
FIG. 13B is an exemplary graph of offset count data resulting from a comparison of non-matching chunks of audio according to another exemplary embodiment of the present disclosure.

FIGS. 13A and 13B represent time offset count data for a matching and non-matching pair of compared audio chinks, respectively. In the time offset data for the matching pair of audio chunks shown in FIG. 13A, the offset count shows a significant ramped peak at a time offset of 47 units, indicative of a good match. In contrast, the time offset count shown in FIG. 13B for a non-matching pair of audio chunks is random, without any significant ramping or evidence of correlation.

Further analysis may be performed to eliminate false matches. For example, for each portion of reference audio, a total of all time offset occurrences may be calculated for a range of time offsets surrounding the time offset having the highest number of occurrences. Any time offset having only one occurrence may not be counted towards the time offset range occurrence total. For example, if a range of ±2 is used, "Ad 1" in the example shown above in Tables 3 and 4 may have time offset range (72-76) occurrence total of 3 and "Ad 4" may have a time offset range (17-21) occurrence total of 6. A time offset range occurrence total may be referred to herein as a neighboring offset count. Having the highest neighboring offset count of 6, "Ad4" in the above examples is confirmed as a likely match.

A threshold highest offset count or neighboring offset count may be established for determining if none of the reference audio portions match input audio. For example, if the highest offset count or neighboring offset count is not above a predetermined threshold, a result of "no match" may be output.

In another aspect of the present application, a plurality of chunk groups selected from the same input audio may be analyzed and the results from analysis of the different chunk groups may be consolidated into a final consolidated result. For example, chunks may be selected from a byte stream of input audio data in the time domain in a time shifted, overlapping manner. A number of shift increments may be selected to produce that number of different groups of chunks of the same input audio to analyze by comparison to a master hash map.

Figure 14:
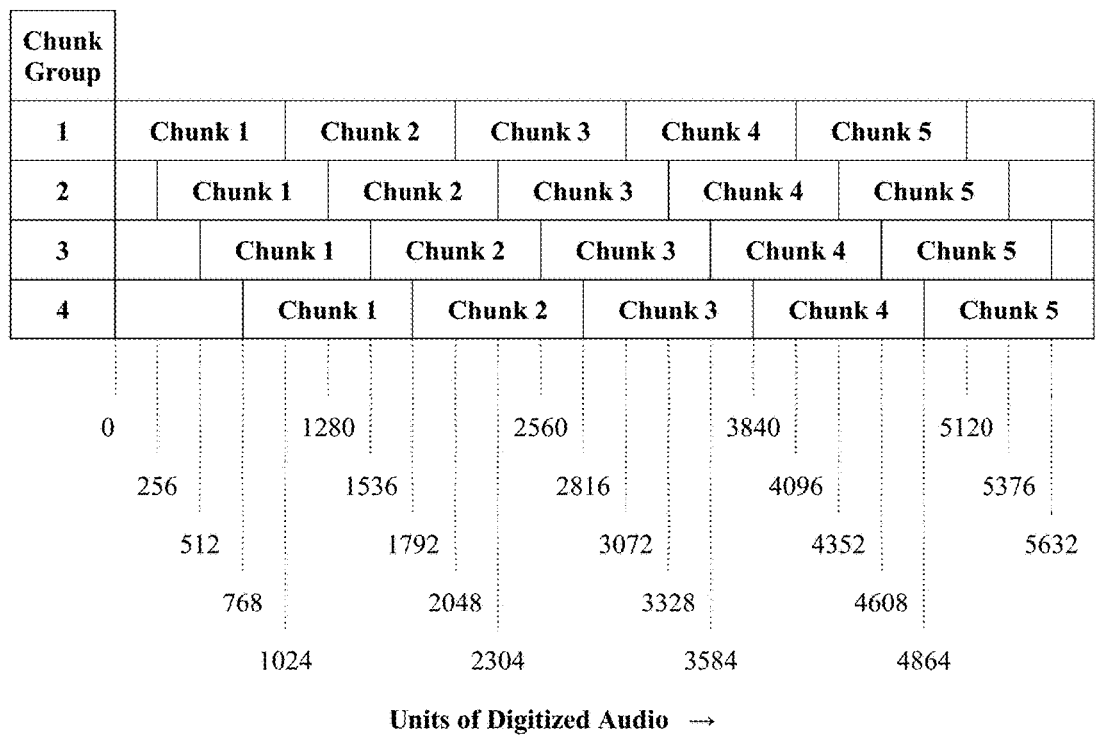
FIG. 14 is a notional illustration of the selection of staggered chunks from a portion of audio according to another exemplary embodiment of the present disclosure.

In one particular example, a chunk may be configured to include 1024 units of a digitized input audio stream and four time shifts may be selected. A shift amount may be determined by dividing the size of each chunk by the number of time shifts selected. In this example, 1024 units/four shifts=256 units per shift. Accordingly, the start and end of each chunk for four sets of chunks may be offset or staggered by 256 units. An example is shown in FIG. 12. In FIG. 14, the first group of chunks begins at unit 0, the second group begins at unit 256 and so on.

Each chunk group may be analyzed separately, obtaining a separate neighborhood offset count (NOC) for reference audio portions for each chunk group. An example is shown below in Table 5 of four chunk groups and neighborhood offset counts obtained for relevant reference audio portions. The neighborhood offset counts are then summed and the reference audio portion having the highest total neighborhood offset count is selected as a match, as long as its neighborhood offset count is above a predetermined match threshold. In the example shown, "Ad4" is selected as a match.

TABLE 5

| Chunk Group | Neighborhood Offset Counts |
| --- | --- |
| 1 | Ad 1: NOC 9; Ad 4: NOC47 |
| 2 | Ad 1: NOC 4; Ad 4: NOC83 |
| 3 | Ad 1: NOC 3; Ad 4: NOC71; Song 5: NOC2 |
| 4 | Ad 1: NOC 2; Ad 4: NOC32 |
| SUM | Ad 1: NOC 18; Ad 4: NOC233; Song 5: NOC2 |

The neighboring offset count method has several advantages over the highest offset count method. The neighboring offset count method increases the number of hits for a matching reference audio portion without increasing the hits for non-matching reference audio portion. This helps eliminate false matches. The neighboring offset count method helps in identifying the ramped peak found in matching chinks (see FIG. 13A and the above description thereof) versus the numerous small spikes found in non-matching chunks (see FIG. 13B and the above description thereof) when plotting their offset counts. In addition, the neighboring offset count method helps reduce false matches in identifying audio with low entropy (such as spoken radio advertisements which contain very little music).

As an example, a soda radio advertisement is compared to master list of reference audio portions using the neighboring offset count method and the highest offset count method, the results of which are shown below in Table 6.

TABLE 6

| Reference Audio Portions | HOC | NOC |
| --- | --- | --- |
| soda radio ad | 8 | 76 |
| car radio ad | 10 | 11 |
| radio talk show | 5 | 6 |
| clothing TV commercial | 5 | 5 |
| fast food radio ad | 3 | 3 |

As shown, while the highest offset count method may result in a false match in some circumstances, the neighborhood offset count method produces more contrast between the matching reference audio portion and the input audio.

In another aspect of the present application, a reward may be communicated to a user's computer system from a reward management apparatus or server in response to matching an input (such as audio, video, text, a barcode, etc.) to a reference associated with the reward. Input audio may be matched with reference audio according to the present application or by another suitable method. For example, a user may choose to input audio from a commercial advertisement being played on television in their vicinity and may receive a reward related to a product being advertised.

Figure 15:
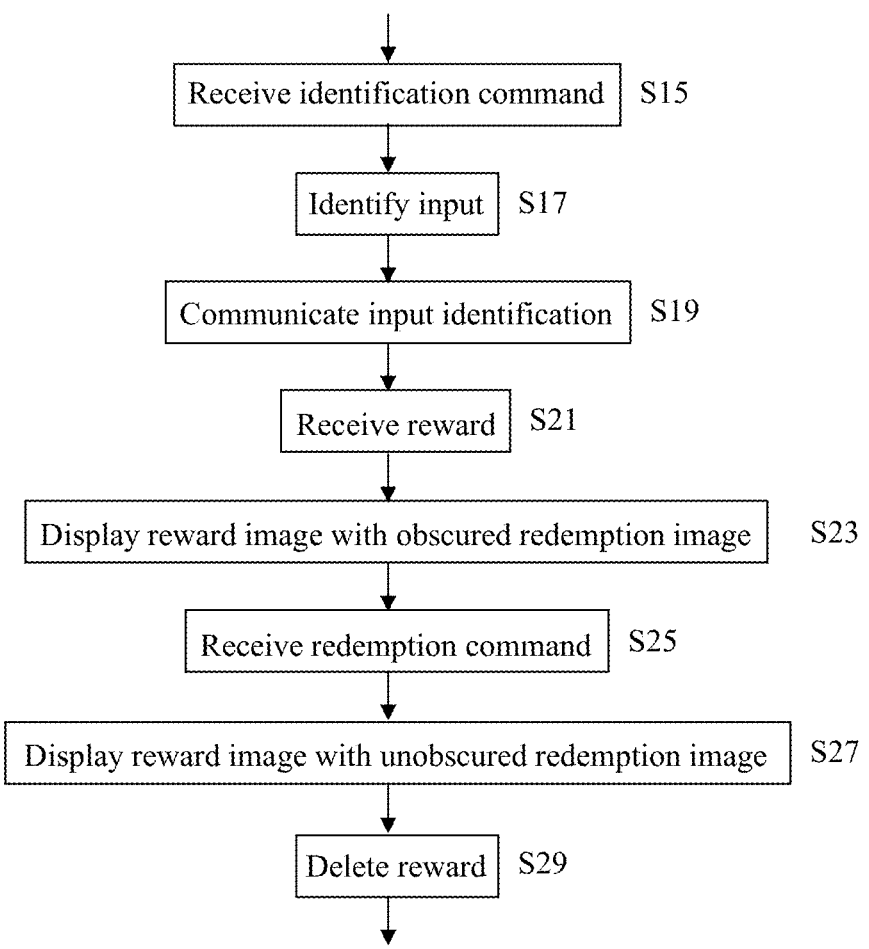
FIG. 15 is a notional flowchart illustrating reward provision program according to an exemplary embodiment of the present disclosure.

In one example, depicted in FIG. 15, a client computer system receives a command to identify an input S15 and proceeds to identify the input S17. Alternatively, the input may be communicated to the server and the server may perform the input identification. Once the input is identified, the input identification is communicated to the server from the client computer system or within a server's processor S19. Next, the server communicates a reward associated with the input identification to the client computer system S21. The reward may consist of a reward image, an unobscured reward redemption image (such as a readable barcode) and an obscured redemption image (such as an unreadable, blurred or scrambled barcode). The reward is stored by the client computer system S23 automatically or in response to a store command input by the user. Rewards may be saved in a reward catalog which may be organized according to categories of rewards, categories of products related to the rewards, etc.

Figure 16:
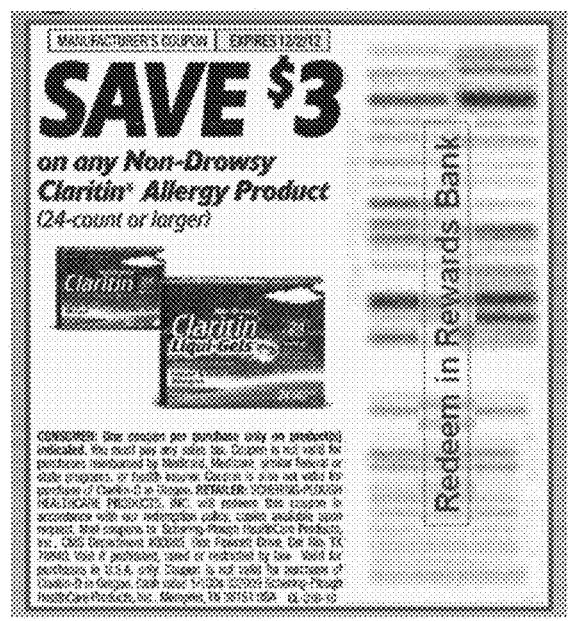
FIGS. 16 and 17 illustrate the display of rewards according to exemplary embodiments of the present disclosure.
Figure 17:
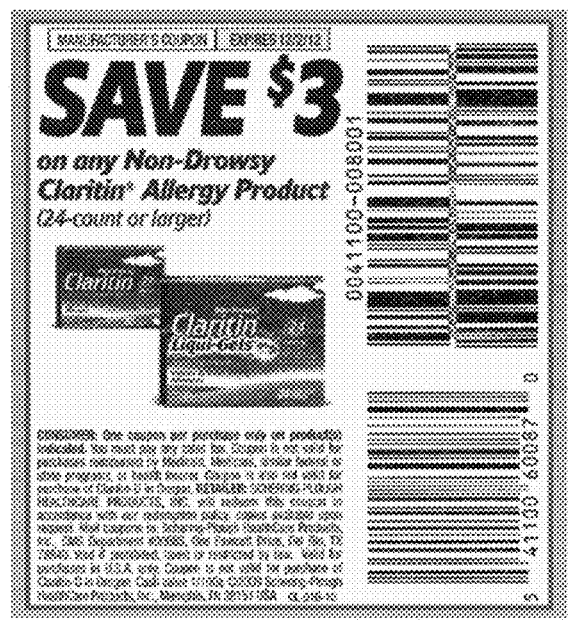

The reward image may be displayed together with the obscured reward redemption image S25 until a user is ready to redeem the reward, as shown in FIG. 16. In response to a redemption command from the user, the reward image is displayed together with the unobscured reward image S27 as shown in FIG. 17. The reward is deleted S29 after a predetermined time has passed since receipt of the redemption command, in response to a deletion command from the user, after the reward is redeemed, etc.

In another aspect of the present application, metrics may be maintained relating to the provision and redemption of rewards. For example, a reward provision metric may be incremented every time a reward is communicated by a reward management apparatus to a client computer system. As another example, a reward redemption metric may be incremented every time confirmation is received by a reward management apparatus that a reward has been redeemed. As another example, an input identification metric may be incremented each time a reward management apparatus is communicated an input identification (such as identification of an advertisement). Such metrics may be graphically displayed or otherwise analyzed to provide an indication of the success or popularity of a particular reward or input. Other metrics may be recorded and analyzed together with the input identification metric, reward provision metric and reward redemption metrics, such as, for example, a user's age, gender, marital status, income, race, home city or zip code, etc.

In addition, the embodiments and examples above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

What is claimed is:

1. A method, executed by a processor of a computing device, the method being performed in link with a frequency domain, comprising a plurality of frequency ranges, each of said frequency ranges comprising a plurality of frequency subranges identified by an alphanumeric or numeric label, said method comprising:
   for each chunk of a plurality of chunks of an input audio data:
      identifying a frequency subrange, within each of the plurality of frequency ranges, at which frequency-domain data derived from said each chunk, has a maximum amplitude; and
      combining alphanumeric or numeric labels assigned to each of the identified frequency subranges into a hash key characteristic of said each chunk;
   if a hash key for a first input audio chunk of said plurality of chunks of the input audio data matches a hash key, of a first known audio chunk, of a master list of hash keys for a plurality of chunks of known audio portions, said hash keys of said master list combining said alphanumeric or numeric labels identifying frequency subranges of said frequency domain, recording, as a time offset occurrence, a result of subtracting, from a sequential number identifying the first input audio chunk, a sequential number identifying the first known audio chunk; and
   matching the input audio data with a known audio portion based on a number, for each known audio portion, of recorded time offset occurrences, each of said recorded time offset occurrences relating to a chunk amongst said plurality of chunks of said known audio portion and to a chunk amongst said plurality of chunks of the input audio data selected according to a plurality of selection patterns.

2. The method of claim 1 wherein said matching of the input audio data is performed upon receiving an identification command from a user for identifying said input, and said method comprises:
   communicating the input identification to a reward management apparatus;
   receiving from the reward management apparatus a reward associated with the input identification comprising a reward image, an obscured reward redemption image and an unobscured reward redemption image;
   storing the reward;
   displaying the reward image together with the obscured reward redemption image;
   displaying the reward image together with the unobscured reward image only after receiving a redemption command from a user; and
   deleting the reward.

3. The method of claim 2, wherein the reward is deleted after a predetermined period of time has elapsed since receipt of the redemption command from the user.

4. The method of claim 2, wherein the reward is deleted after receiving a deletion command from the user.

5. The method of claim 2, wherein the reward is deleted after receiving confirmation that the reward was redeemed.

6. The method of claim 2, wherein a plurality of rewards are associated with the input identification and the method comprises receiving the reward associated with the input identification which has not previously been received.

7. The method of claim 2, wherein the method comprises storing the reward only after receiving a store reward command from the user.

8. A computing device comprising at least a processor, storage, a user input part, a communication part and a display part, wherein the storage is configured to store instructions executable by the processor to perform a method being performed in link with a frequency domain, comprising a plurality of frequency ranges, each of said frequency ranges comprising a plurality of frequency subranges identified by an alphanumeric or numeric label, the method comprising:

for each chunk of a plurality of chunks of an input audio data:
identifying a frequency subrange, within each of the plurality of frequency ranges, at which frequency-domain data derived from said each chunk, has a maximum amplitude; and
combining alphanumeric or numeric labels assigned to each of the identified frequency subranges into a hash key characteristic of said each chunk;

if a hash key for a first input audio chunk of said plurality of chunks of the input audio data matches a hash key, of a first known audio chunk, of hash keys for a plurality of chunks of known audio portions, said hash keys of said master list combining said alphanumeric or numeric labels identifying frequency subranges of said frequency domain, recording, as a time offset occurrence, a result of subtracting, from a sequential number identifying the first input audio chunk, a sequential number identifying the first known audio chunk; and matching the input audio data with a known audio portion based on a number, for each known audio portion, of recorded time offset occurrences, each of said recorded time offset occurrences relating to a chunk amongst said plurality of chunks of said known audio portion and to a chunk amongst said plurality of chunks of the input audio data selected according to a plurality of selection patterns.

* * * * *